United States Patent
Veedu et al.

(10) Patent No.: US 7,192,642 B2
(45) Date of Patent: Mar. 20, 2007

(54) SINGLE-WALL CARBON NANOTUBE FILM HAVING HIGH MODULUS AND CONDUCTIVITY AND PROCESS FOR MAKING THE SAME

(75) Inventors: Sreekumar T. Veedu, Atlanta, GA (US); Satish Kumar, Lawrenceville, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 604 days.

(21) Appl. No.: 10/386,370

(22) Filed: Mar. 11, 2003

(65) Prior Publication Data

US 2007/0041887 A1    Feb. 22, 2007

Related U.S. Application Data

(60) Provisional application No. 60/367,120, filed on Mar. 22, 2002.

(51) Int. Cl.
*D01F 9/12* (2006.01)

(52) U.S. Cl. ............... 428/367; 423/447.2; 428/408; 524/495; 252/502

(58) Field of Classification Search ............ 423/447.2; 977/DIG. 1; 428/367, 408; 252/502; 524/495
See application file for complete search history.

(56) References Cited

FOREIGN PATENT DOCUMENTS

| WO | WO9839250 | 9/1998 |
|---|---|---|
| WO | WO0017101 | 3/2000 |
| WO | WO02064868 | 8/2002 |
| WO | WO02064869 | 8/2002 |

OTHER PUBLICATIONS

Bozhko et al., *Appl. Phys. A*, 67:75-77 (1998).
Hone et al., *Applied Physics Letters*, 77:666-668 (2000).
Sreekumar et al., *Chem. Mater.*, 15:175-178 (2003).
Baughman et al., *Science*, 284:1340-1344 (1999).
Bae et al., *Physical Review B*, 64:233401-1-233401-4 (2001).
Baibarac et al., *Synthetic Metals*, 121:1199-1200 (2001).
Baughman et al., *Science*, 297:787-792 (2002).
Chen et al., *J. Phys. Chem. B*, 105:2525-2528 (2001).
Fischer et al., *Physical Review B*, 55:R4921-R4924 (1997).
Ichida et al., *Journal of the Physical Society of Japan*, 68:3131-3133 (1999).
Kaiser et al., *Physical Review B*, 57:1418-1421 (1998).
Kazaoui et al., *Applied Physics Letters*, 78:3433-3435 (2001).
Kim et al., *Physical Review B*, 58:16 064-16 069 (1998).
Lefrant et al., "SERS Studies on Conducting Polymers and Carbon Nanotubes," presented at *Progress in Surface Raman Spectroscopy: Theory, Techniques and Applications* (satellite meeting of *ICORS 2000*), Xiamen, China (Aug. 16, 2000).
Ruzicka et al., *Physical Review B*, 61:R2468-R2471 (2000).
Smith et al., *Applied Physics Letters*, 77:663-665 (2000).
Vigolo et al., *Science*, 290:1331-1334 (2000).
Wang et al., *J. Phys. Chem. B*, 105:9422-9425 (2001).
Yakobson et al., *American Scientist*, 85:324-337 (1997).

*Primary Examiner*—Stuart Hendrickson
(74) *Attorney, Agent, or Firm*—Williams, Morgan & Amerson, P.C.

(57) ABSTRACT

The invention relates to a film comprising greater than 80 wt % single-wall carbon nanotubes wherein the tensile modulus is at least about 6 GPa at 0.2% strain and the conductivity of the film is at least about 70,000 S/m. The tensile modulus is typically about 8 GPa at 0.2% strain. The method for making the film comprises preparing a solution of single-wall carbon nanotubes in a superacid, such as oleum containing approximately 20 to 30% sulfur trioxide, under a dry, oxygen-free atmosphere. The solution is placed on a surface in a moisture-containing atmosphere, wherein the solution absorbs moisture and acid leaches out. The film is washed to further remove acid, dried, and, optionally, subjected to a heat treatment. Besides free-standing films, coatings of single-wall carbon nanotubes can be made on a variety of surfaces including polymers, glass, metals, and ceramics. The surfaces can be flat planes, fibers or contour shapes.

2 Claims, 3 Drawing Sheets

Figure 1A                    Figure 1B                    Figure 1C
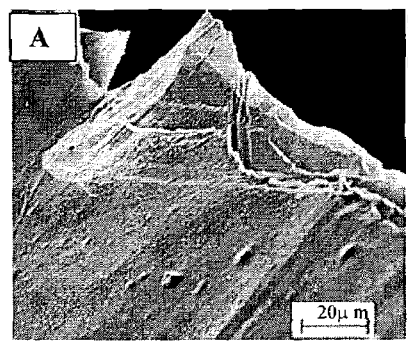 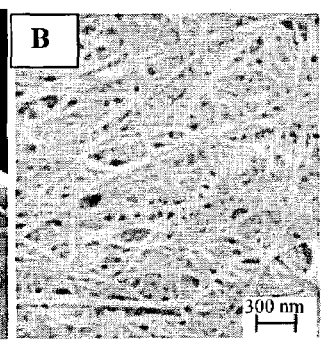 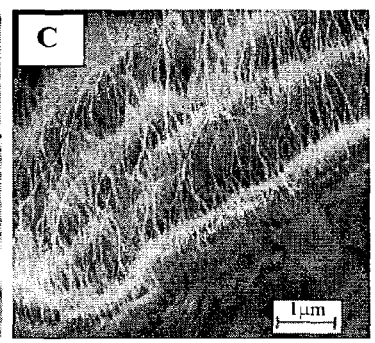
Figure 2
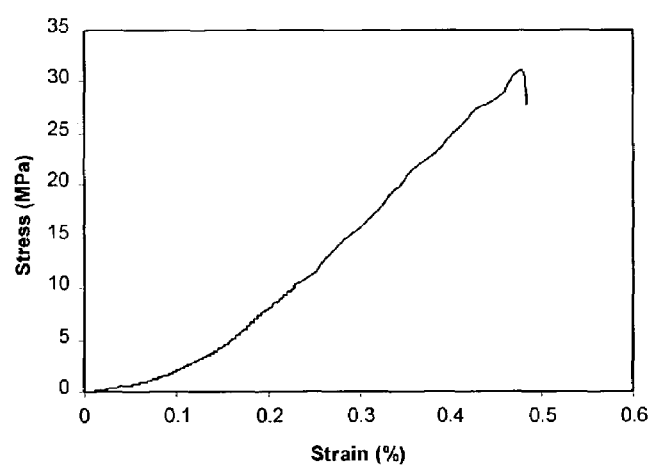

SINGLE-WALL CARBON NANOTUBE FILM HAVING HIGH MODULUS AND CONDUCTIVITY AND PROCESS FOR MAKING THE SAME

CROSS-REFERENCE TO RELATED APPLICATION

This application claims priority from U.S. provisional application Ser. No. 60/367,120, filed Mar. 22, 2002, which application is incorporated herein by reference.

This invention was made with United States Government support under Grant No. F49620-00-1-0147 awarded by the Air Force Office of Scientific Research and under Grant No. N00014-01-1-0657 awarded by the Office of Naval Research. Government may have certain rights in the invention.

FIELD OF THE INVENTION

This invention relates generally to single-wall carbon nanotubes, and more particularly to a film comprising single-wall carbon nanotubes, and even more particularly to a high tensile modulus, high strength, high conductive film comprising single-wall carbon nanotubes.

BACKGROUND OF THE INVENTION

Single-wall carbon nanotubes (SWNT), commonly known as "buckytubes," have been the subject of intense research since their discovery due to their unique properties, including high strength, stiffness, thermal and electrical conductivity. SWNT are fullerenes consisting essentially of $sp^2$-hybridized carbon atoms typically arranged in hexagons and pentagons. For background information on single-wall carbon nanotubes see B. I. Yakobson and R. E. Smalley, *American Scientist*, Vol. 85, July–August, 1997, pp. 324–337. Multi-wall carbon nanotubes are nested single-wall carbon cylinders and possess some properties similar to single-wall carbon nanotubes. However, since single-wall carbon nanotubes have fewer defects than multi-wall carbon nanotubes, the single-wall carbon nanotubes are generally stronger and more conductive. Additionally, compared to multi-wall carbon nanotubes, single-wall carbon nanotubes have considerably higher available surface area per gram of carbon.

However, the full potential of the properties of single-wall carbon nanotubes have not been fully realized due to the difficulty of dispersing the nanotubes. The problems associated with dispersing single-wall carbon nanotubes are due largely to their insolubility in most common solvents and their propensity to rope together in SWNT bundles and be held tightly together by van der Waals forces. Attempts have been made to dissolve and characterize SWNTs in various organic solvents such as dimethyl formamide (DMF) and n-methyl pyrrolidone. Some solubilization has been attained in common organic solvents, but solubilization was achieved by significantly modifying the single-wall carbon nanotubes, i.e. cutting the nanotube lengths (i.e. to a length in the range of about 100 to 300 nm, such as by sonication) and derivatizing the shortened tubes with covalently-bonded functional groups that enhance solubility. Uncut SWNTs have also been made soluble by ionic functionalization of the carboxylic acid groups present at the open edges of purified SWNTs. Solubilization of the carboxylated nanotubes with latter procedure was achieved in 4 to 8 days of heating at 120–130° C. in neat octadecylamine and exfoliated the SWNT bundles from large ropes (10–25 nm in diameter) to small ropes (2–5 nm in diameter). Details of this derivatization can be found in Chen, et al. *J. Phys. Chem. B*, 2001, 105, p. 2525–2528.

Films of single-wall carbon nanotube films having high conductivity can be used in a variety of applications, including electrodes for capacitors, supercapacitors, actuators and fuel cells. Fabrication of high modulus single-wall nanotube film products for these and other applications remains a major challenge.

SUMMARY OF THE INVENTION

The present invention relates to a high tensile modulus, high strength, high conductivity film comprising single-wall carbon nanotubes and method for making the same. In one embodiment, the single-wall carbon nanotube film is an optical transparent coating on a fiber or other substrate.

In another embodiment, the single-wall carbon nanotube film is prepared from an optically transparent, non-birefringent solution comprising single-wall carbon nanotubes and oleum ($H_2SO_4$ and $SO_3$) containing about 20 to 30% sulfur trioxide. After the nanotube-oleum solution is made under a dry, inert atmosphere, a film can be formed. The film formation can be on a flat, such as a glass plate, or contoured substrate, such as a fiber. The solution is removed from the dry atmosphere and exposed to a moisture-containing atmosphere. During film formation, moisture is absorbed by the nanotube-oleum solution and acid leaches out. When no further leaching is observed, the resulting film is washed to further remove acid. The washed film is dried and, optionally heat treated.

In one embodiment, the method for making a single-wall carbon nanotube film comprises preparing a mixture comprising single-wall carbon nanotubes and a superacid in a dry, oxygen-free atmosphere; and forming a film in a moisture-containing atmosphere, wherein the film comprises at least about 80 wt % single-wall carbon nanotubes. The resulting film generally comprises at least about 80 wt % single-wall carbon nanotubes, preferably at least about 90 wt % single-wall carbon nanotubes, more preferably, at least about 95 wt % single-wall carbon nanotubes, and more preferably at least about 99 wt % single-wall carbon nanotubes, and has a tensile modulus of at least about 6 GPa at 0.2% strain, preferably at least about 7 GPa, and more preferably at least about 8 GPa. Typically, the electrical conductivity of a film prepared in this manner can have an electrical conductivity in the range of about $3 \times 10^4$ S/m and about $1.5 \times 10^5$ S/m, preferably at least about $6 \times 10^4$ S/m, and more preferably at least about $7 \times 10^4$ S/m.

In one embodiment, the single-wall carbon nanotube film has a tensile modulus of about 8 GPa (gigaPascals) at 0.2% strain, strength of about 30 MPa (megaPascals), elongation to break of about 0.5%, and an in-plane conductivity of about $1 \times 10^5$ Siemens/meter (S/m). This embodiment has a modulus over six times greater than that of bucky paper, a tensile strength over five times greater than that of bucky paper and a conductivity of about one order of magnitude greater than that of bucky paper.

BRIEF DESCRIPTION OF THE DRAWINGS

FIG. 1A shows a scanning electron micrograph of SWNT film.

FIG. 1B shows a scanning electron micrograph of SWNT film.

FIG. 1C shows a scanning electron micrograph of SWNT film.

FIG. 2 shows a stress-strain curve of heat-treated SWNT film.

DETAILED DESCRIPTION OF SPECIFIC EMBODIMENTS

Figure 3:
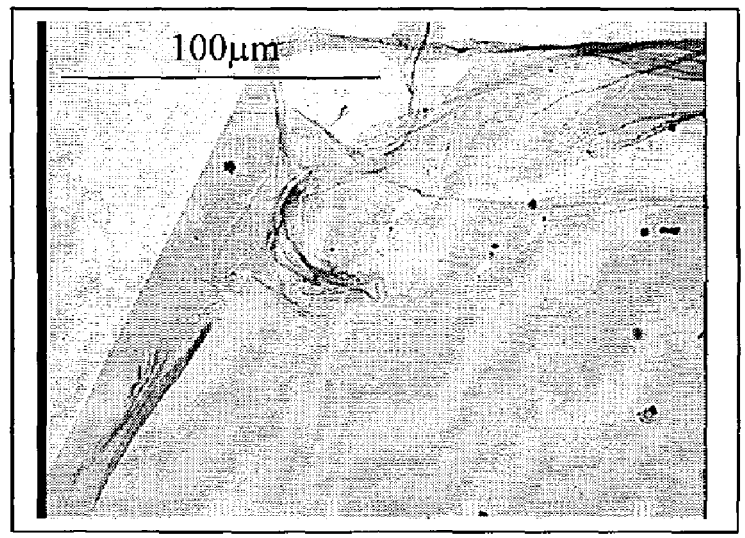
FIG. 3 shows an optical micrograph of SWNT film on glass.

The present invention relates to a high modulus, high strength, high conductivity single-wall carbon nanotube film and method for making the same. In one embodiment, the single-wall carbon nanotube film is an optically transparent coating on a fiber or other substrate.

In one embodiment, the single-wall carbon nanotube film is prepared from an optically transparent, non-birefringent solution comprising single-wall carbon nanotubes and oleum ($H_2SO_4$ and $SO_3$) containing about 20 to 30% sulfur trioxide. After the nanotube-oleum solution is made under a dry, inert atmosphere, a film is formed. The solution is removed from the dry atmosphere and exposed to a moisture-containing atmosphere. During film formation, moisture is absorbed by the nanotube-oleum solution and acid leaches out. After no further leaching is observed, the resulting film is washed to further remove acid. The washed film is dried and, optionally, subjected to a heat treatment.

In another embodiment, the single-wall carbon nanotube film has a tensile modulus of about 8 GPa at 0.2% strain, strength of about 30 MPa, strain-to-failure of about 0.5% elongation to break and an in-plane conductivity of about $1 \times 10^5$ Siemens/meter (S/m).

The carbon nanotubes can be made by any known means. The carbon nanotubes can be used as synthesized or after purification. Purification of the nanotube material can be done to remove amorphous carbon, metallic impurities and non-nanotube carbon. For certain applications, purification may be preferred and can be done by any known means. Suitable procedures for purification of carbon nanotubes are related in International Patent Publications "Process for Purifying Single-Wall Carbon Nanotubes and Compositions Thereof," WO 02/064,869 published Aug. 8, 2002, and "Gas Phase Process for Purifying Single-Wall Carbon Nanotubes and Compositions Thereof," WO 02/064,868 published Aug. 8, 2002, and included herein in their entirety by reference.

For certain applications and embodiments, the carbon nanotubes can be derivatized on one or both ends and/or sides with functional groups, such as alkyl, acyl, aryl, aralkyl, halogen; substituted or unsubstituted thiol; unsubstituted or substituted amino; hydroxy, and OR' wherein R' is selected from the group consisting of alkyl, acyl, aryl aralkyl, unsubstituted or substituted amino; substituted or unsubstituted thiol, and halogen; and a linear or cyclic carbon chain optionally interrupted with one or more heteroatom, and optionally substituted with one or more =O, or =S, hydroxy, an aminoalkyl group, an amino acid, or a peptide. The typical number of non-aromatic carbon atoms for alkyl, acyl, aryl and aralkyl groups can range from one to about 30. The typical number of carbon atoms in the aromatic ring portion of aryl and aralkyl groups is typically from about 6 to 14. Suitable procedures for derivatizing single-wall carbon nanotubes are related in International Patent Publications "Carbon Fibers Formed from Single-Wall Carbon Nanotubes," WO 98/39250 published Sep. 11, 1998, and "Chemical Derivatization of Single-Wall Carbon Nanotubes to Facilitate Solvation Thereof; and Use of Derivatized Nanotubes," published Mar. 30, 2000, and included herein in their entirety by reference.

The oleum solution comprises 100% sulfuric acid ($H_2SO_4$) and sulfur trioxide ($SO_3$). Preferably, the sulfur trioxide is present in a concentration range of about 20% to 30% of the sulfuric acid. Oleum is a type of superacid. Other superacids that are useful for making SWNT solutions can be of various types, such as Brønsted superacids, Lewis superacids, and conjugate Brønsted-Lewis superacids. The superacids can be in a melt, liquid or gaseous form. Brønsted superacids are those whose acidity exceeds that of 100% sulfuric acid. Examples of Brønsted superacids include perchloric acid ($HClO_4$), chlorosulfuric acid ($ClSO_3H$), fluorosulfuric acid ($HSO_3F$), chlorosulfonic acid, fluorosulfonic acid, and perfluoroalkanesulfonic acids, such as trifluoromethanesulfonic acid ($CF_3SO_3H$), also known as triflic acid, and higher perfluoroalkanesulfonic acids, such as $C_2F_5SO_3H$, $C_4F_9SO_3H$, $C_5F_{11}SO_3H$, $C_6F_{13}SO_3H$, $C_8F_{17}SO_3H$,

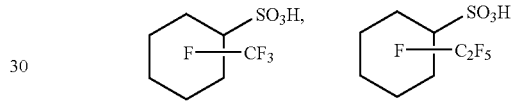

and α, ω-perfluoroalkanedisulfonic acids. Lewis superacids have been defined by Olah, et al. (See "Superacids" John Wiley & Sons, 1985) as those acids stronger than anhydrous aluminum chloride. Lewis superacids include antimony pentafluoride, arsenic pentafluoride, tantalum pentafluoride and niobium pentafluoride. Antimony pentafluoride and arsenic pentafluoride form stable intercalation compounds with graphite. Conjugate Brønsted-Lewis superacids include $SO_3$-containing sulfuric acids, also known as oleums or polysulfuric acids, polyphosphoric acid-oleum mixtures, tetra(hydrogen sulfato)boric acid-sulfuric acid, fluorosulfuric acid-antimony pentafluoride (also known as "magic acid"), fluorosulfuric acid-sulfur trioxide, fluorosulfuric acid-arsenic pentafluoride, $HSO_3F:HF:SbF_5$, $HSO_3F:SbF_5:SO_3$, perfluoroalkanesulfonic acid-based systems, such as $C_nF_{2n+1}SO_3H:SbF_5$, where n=1, 2 or 4, and $CF_3SO_3H:B(SO_3CF_3)_3$, hydrogen-fluoride-antimony pentafluoride (also known as fluoroantimonic acid), hydrogen fluoride-tantalum pentafluoride, hydrogen fluoride-boron trifluoride (also known as tetrafluoroboric acid), and conjugate Friedel-Crafts acids, such as $HBr:AlBr_3$, and $HCl:AlCl_3$. For description and clarity, oleum will be used herein as the exemplary acid; however, it would be recognized by those of ordinary skill in the art to utilize anhydrous 100% sulfuric acid or any other superacid, such as those listed above.

A nanotube-oleum solution/dispersion comprising single-wall carbon nanotubes and oleum can be prepared by mixing carbon nanotubes with oleum by any known mixing means, such as, for example, magnetic stirring, sonication, homogenization, and combinations thereof. Heat can also be applied to facilitate the preparation of the solution/dispersion. Temperatures from room temperature up to the boiling point of the oleum can be used. Note that for this application, the terms "solution," "solution/dispersion", "dispersion", "mixture" and "suspension" are intended to have the same meaning and will be used interchangeably.

The solution of nanotubes formed in the oleum is intended to be generally isotropic and homogeneous. The nanotubes can be in bundles or as individual nanotubes in the solution. The nanotube-oleum solution is prepared in a dry, oxygen-free, inert atmosphere, such as in a dry box or glove box. The inert atmosphere can include nitrogen, inert gases, such as argon, and combinations thereof.

The concentration of carbon nanotubes in oleum can range from about 0.01 wt % to about 10 wt %, preferably about 0.05 wt % to about 5 wt %. Combinations of dispersing techniques can be done simultaneously or in succession.

The time required for homogenizing the nanotube-oleum solution is dependent on the concentration of the nanotubes in the oleum, the mixing means and temperature during mixing. A typical nanotube-oleum mixing time can be from a few minutes to several hours, such as, for example, about 10 minutes to about 4 hours.

After the nanotubes are homogeneously dispersed in the oleum, the nanotube film can be prepared. The film can be made by any known means. In one embodiment, the nanotube-oleum solution can be put on a surface, such as a flat plate, dish, or pan, such as a Petri dish. A fiber is another example of a surface. The solution on the surface of a fiber or plate, or in a dish or pan, is removed from the dry, oxygen-free, inert atmosphere and exposed to a moisture-containing atmosphere. In the moisture-containing atmosphere, the nanotube-oleum solution absorbs moisture. As the moisture is absorbed, the acid leaches from the nanotubes. As the nanotube-oleum solution on the surface absorbs moisture, generally clear liquid migrates to and beyond the edge of the nanotube mixture onto the surface not covered by the nanotube mixture. This migration of clear liquid is referred to as "acid leaching." As acid leaches from the nanotubes, a film comprising nanotubes forms. Leaching times vary depending on the amount of solution put on the surface. Typical leaching times can range from about 10 minutes to several hours.

After no further leaching is observed, a film is formed, and the film is washed to further remove acid. Washing can be done with any convenient solvent, however, solvents in which the acid has a high solubility are preferred. Examples of polar solvents, include, but are not limited to, acetone, alcohols, distilled water, and combinations thereof. Multiple washing is preferred, such as washing with acetone, followed by washing with distilled water.

Removal of the remaining water or other solvent can be achieved by any known drying means, such as with the application of heat, application of a vacuum, ambient solvent evaporation, or a combination thereof. The time and temperature needed are dependent on various parameters, including, but not limited to the particular solvent used and the amount of solvent to be removed. Typical drying conditions for a film made in a Petri dish could be about an hour under vacuum at about 110° C.

After drying, the film can, optionally, be removed from the surface and cut into pieces of the shape suitable for the desired end use application.

Optionally, the dried film can be subjected to a heat treatment at an elevated temperature, such as at 350° C. for 1 hour under a nitrogen or inert atmosphere, such as argon. Heat treating can also be done in air or an oxidative environment. Heat treatment temperatures in nitrogen or inert environments can typically be higher than in oxidative environments. Typically, heat treatment in nitrogen or inert gases can be done at temperatures up to about 800° C. Heat treatment in air or oxidative atmospheres can be done at temperatures up to about 400° C.

The nanotube-oleum solution can be applied to many surfaces, including fibers, to produce coatings or films of single-wall carbon nanotubes on the substrate. Using low concentrations of single-wall carbon nanotubes, for example less than about 1 wt % SWNT in oleum, it is possible to make an optically transparent SWNT coating or film on a substrate. Examples of substrates include, but are not limited to, glass, ceramics, polymers, metals and combinations thereof. The form of the substrate can be that of a flat surface, a fiber, or any other shape desired for the end-use application.

The film or coating typically comprises at least about 80 wt % single-wall carbon nanotubes, preferably at least about 90 wt % single-wall carbon nanotubes, more preferably at least about 95 wt %, and more preferably at least about 99 wt % single-wall carbon nanotubes.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example demonstrates a method for preparing a film comprising single-wall carbon nanotubes. Purified, single-wall carbon nanotubes (Lot No. HPR87) were obtained from Rice University, where they were made in a high temperature, high pressure, all-gas phase process through the disproportionation of carbon monoxide (CO) to SWNT and $CO_2$ using iron as the transition metal catalyst. The purified tubes were vacuum dried at 110° C. and analyzed by thermogravimetric analysis (TGA) using a TA Instruments TGA2950 at a 10° C./min ramp rate in nitrogen. TGA showed that the purified nanotubes contained about 7 wt % ash above 800° C., which is attributed to residual catalyst that was not removed in purification.

The purified and vacuum-dried SWNTs (0.125 g) were mixed with 50 g oleum ($H_2SO_4$:30% $SO_3$) in a glass flask placed in a glove box under a dry nitrogen atmosphere. The mixture was maintained at 60° C. and stirred about 2 hours using a magnetic stirrer to form a SWNT/oleum solution/dispersion.

A small amount of 0.25 wt % SWNT-in-oleum mixture was poured into a dry Petri dish in a dry, inert environment in a glove box. The Petri dish was covered, removed from the glove box, moved to a ventilated hood, where the cover was removed. In the ambient, room temperature air, the solution absorbed moisture and the acid began to leach out from the center. When no more leaching was observed, the resulting film was washed while still in the Petri dish to further remove acid. Washings were done first with acetone, followed by distilled water, and followed again with acetone. The film was then vacuum dried at 110° C. for 1 hour while still in the Petri dish. After the film was removed from the Petri dish and it was referred to as "as-prepared" film. A "heat treated" film was prepared from the "as-prepared" film by heating the "as-prepared" film for 1 hour at 350° C. under nitrogen. Film density of the as-prepared film was estimated to be about 0.9 g/cm$^3$ using a flotation method with an isopropanol/water mixture.

Scanning electron microscopy (SEM) was done on the films by fracturing the films at room temperature and mounting the fractured films an aluminum stub using a conducting tape. SEM was done with a LEO 1530 scanning electron microscope without applying any conducting coating. Scanning electron micrographs of the as-prepared film are shown in FIG. 1A at low magnification and FIG. 1B at high magnification. The scanning electron micrograph in FIG. 1C shows an edge of the as-prepared film at an intermediate magnification. FIG. 1B shows that surface of the film comprise ropes of single-wall carbon nanotubes in an isotropic arrangement. The single-wall carbon nanotube rope diameter is estimated to be about 40 nm wide.

Electrical conductivity was measured at room temperature using the four probe method. Measurements were made with a Lucas/Signatone S-301-4 four-probe mounting stand with a Teflon disk and tungsten carbide 4-point probe with a tip separation of 62.5 mils. The current source was supplied with a Keithley 220 programmable current source and the voltage measurements were made with a Keithley 2000 multimeter.

Conductivity is quantified in units of Siemens (S) per unit length, such as S/cm or S/m. (Note: Siemen=mho=1/ohm.) Resistivity, the inverse of conductivity, is quantified in units of ohm-length, such as ohm-cm. The in-plane conductivities of the as-prepared and heat-treated films were 1.3×10$^5$ S/m and 9.0×10$^4$ S/m, respectively. For comparison, the conductivity of a bucky paper of single-wall carbon nanotubes (obtained from Carbon Nanotechnologies, Inc., Houston, Tex.) was also measured. The conductivities of the as-prepared and heat-treated films of the present example are about one order of magnitude greater than that of bucky paper.

TABLE 1

| SWNT Sample | Electrical Conductivity (S/m) | Raman peak position (cm$^{-1}$) | Relative elemental composition (C:O:S:H) |
|---|---|---|---|
| Purified powder | Not measured | 1591 | 97:3:0:0 |
| Bucky paper | 1.0 × 10$^4$ | — | — |
| As-prepared film | 1.3 × 10$^5$ | 1597 | 85.5:10.5:2.5:1.5 |
| Heat-treated film | 0.9 × 10$^5$ | 1593 | 89.6:9.9:0:0.5 |

Raman spectra were collected using a Holoprobe Research 785 Raman Microscope made by Kaiser Optical System, Inc with a laser wavelength of 785 nm.

Elemental composition was evaluated by routine elemental analysis by an outside laboratory and X-ray Photoelectron Spectroscopy (XPS) was done using a Surface Science SSX-100 ESCA spectrometer with monochromatic Al Kα x-rays (hυ=1486.6 eV). XPS curve fitting routine defaults to 80% Gaussian/20% Lorentzian. Default backgrounds are fitted with the Shirley routine.

Tensile tests were done on the heat-treated film sample (0.2 cm wide×0.0015 cm thick×2.5 cm long) using a Rheometrics RSA III at a strain rate of 0.72% per minute. (Note: Film thickness of 0.0015 cm=15 µm.) The tensile stress-strain curve of the heat treated SWNT film is given in FIG. 2. Tensile modulus, strength, and strain-to-failure of the heat-treated film were 8 GPa at 0.2% strain, 30 MPa, and 0.5% elongation to break, respectively. The as-prepared film had similar values. The results for the heat-treated film are compared to those of a bucky paper, obtained from Carbon Nanotechnologies, Inc., in Table 2. The heat-treated film had a modulus over six times greater than the modulus of the bucky paper and a tensile strength over five times greater than that of the bucky paper. Although not meant to be held by theory, the higher modulus and strength of the film of the present invention may be attributed to superacid-induced crosslinking between the nanotubes. Strain-to-failure elongations were comparable for the heat-treated film and the bucky paper.

TABLE 2

| SWNT Sample | Tensile Modulus (GPa) | Tensile Strength (MPa) | Strain-to-Failure Elongation (%) |
|---|---|---|---|
| Heat-treated film | 8 | 30 | 0.5 |
| Bucky paper | 1.2 | 5.6 | 0.8 |

EXAMPLE 2

This example demonstrates a method for preparing optically transparent film coatings of single-wall carbon nanotubes on various substrates. Purified, single-wall carbon nanotubes (Lot No. HPR87) were obtained from Rice University where they were made by a high temperature, high pressure, all-gas phase process through the disproportionation of carbon monoxide (CO) to SWNT and $CO_2$ using iron as the transition metal catalyst. 0.125 g purified and vacuum-dried SWNTs were mixed with 50 g oleum ($H_2SO_4$: 30% $SO_3$) in a glass flask placed in a glove box under a dry nitrogen atmosphere. The mixture was maintained at 60° C. and stirred about 2 hours using a magnetic stirrer to form a SWNT/oleum solution/dispersion.

Optically transparent thin film coatings of single-wall carbon nanotubes were prepared over various substrates such as glass, polyethylene, polystyrene and silicon wafer. In the ambient air, a drop of the 0.25 wt % SWNT-in-oleum mixture was put on each substrate and spread out by rolling a glass rod over the drop. The films absorbed moisture from the ambient air and the oleum diffused outward. When no more oleum diffusion was observed, the resulting film was washed with acetone, followed by distilled water and finally with acetone. In case of the polystyrene substrate, acetone was not used in washing, and only distilled water was used to wash the film. The film was dried at 100° C. for 1 hour.

Figure 4:
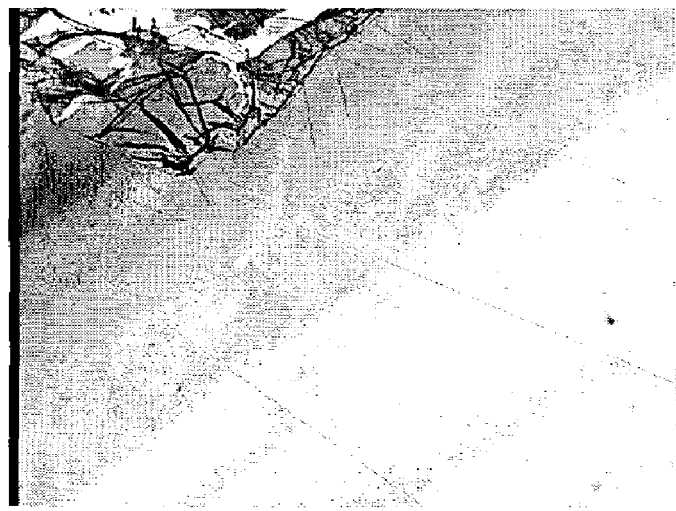
FIG. 4 shows an optical micrograph of SWNT film on polystyrene.
Figure 5:
FIG. 5 shows an optical micrograph of SWNT film on polyethylene.

Optical microscopy of the thin films made over various substrates was carried out on a Leitz polarizing microscope. The films were translucent and could be peeled off the substrates. FIGS. 3, 4, and 5 show optical micrographs of single-wall carbon nanotube film on glass, polystyrene and polyethylene, respectively.

Attempts to make films of single-wall carbon nanotubes on aluminum and stainless steel substrates were also tried using the same procedures as above for glass. However, since the oleum reacts with aluminum, washing was done immediately with acetone.

Figure 6:
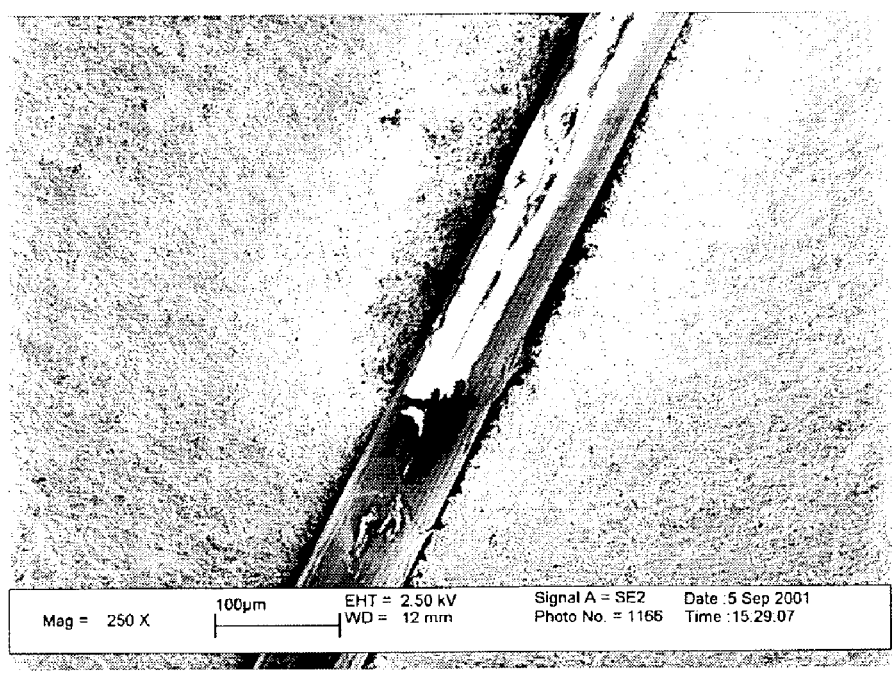
FIG. 6 shows scanning electron micrograph of SWNT film on polyethylene fiber.

Polyethylene and polypropylene fibers were also coated with the 0.25 wt % SWNT-oleum solution. FIG. 6 shows a scanning electron micrograph of single-wall carbon nanotube film on polyethylene fiber.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A film comprising at least about 80 wt % single-wall carbon nanotubes, wherein the film has a tensile modulus of at least about 6 GPa at 0.2% strain, wherein the film is on a substrate, and wherein the substrate is a fiber.

2. The film of claim 1 wherein the fiber comprises a material selected from the group consisting of polyethylene, glass, metal and combinations thereof.

* * * * *

UNITED STATES PATENT AND TRADEMARK OFFICE
CERTIFICATE OF CORRECTION

| | |
|---|---|
| PATENT NO. | : 7,192,642 B2 |
| APPLICATION NO. | : 10/386370 |
| DATED | : March 20, 2007 |
| INVENTOR(S) | : Sreekumar T. Veedu and Satish Kumar |

It is certified that error appears in the above-identified patent and that said Letters Patent is hereby corrected as shown below:

In column 10, line 8, insert -- polypropylene, -- before "glass,".

Signed and Sealed this

Twenty-fourth Day of April, 2007

JON W. DUDAS
*Director of the United States Patent and Trademark Office*